US007302153B2

(12) United States Patent
Thom

(10) Patent No.: US 7,302,153 B2
(45) Date of Patent: Nov. 27, 2007

(54) FIBER MANAGEMENT ACCESS SYSTEM

(75) Inventor: Terry T. Thom, Greenacres, WA (US)

(73) Assignee: Telect Inc., Liberty Lake, WA (US)

( * ) Notice: Subject to any disclaimer, the term of this patent is extended or adjusted under 35 U.S.C. 154(b) by 0 days.

(21) Appl. No.: 11/259,611

(22) Filed: Oct. 26, 2005

(65) Prior Publication Data

US 2007/0104449 A1 May 10, 2007

(51) Int. Cl.
*G02B 6/00* (2006.01)
(52) U.S. Cl. .................. 385/135; 385/134; 385/136; 385/137
(58) Field of Classification Search ......... 385/134–137
See application file for complete search history.

(56) References Cited

U.S. PATENT DOCUMENTS

| 6,535,681 B2 * | 3/2003 | Daoud et al. ............... 385/134 |
| 6,763,171 B2 * | 7/2004 | D'Inca ....................... 385/135 |
| 6,845,207 B2 * | 1/2005 | Schray ....................... 385/135 |

* cited by examiner

*Primary Examiner*—Jennifer Doan
(74) *Attorney, Agent, or Firm*—Lee & Hayes, PLLC

(57) ABSTRACT

A fiber management access system includes a guide that can be movably coupled to an exterior of a chassis for routing fibers of the system. The guide can include a channel for directing fibers of the system to a side of the guide, and can have multiple routing troughs located in the channel for routing the fibers. The guide can be movable to allow access to a serviceable element of the fiber management access system.

24 Claims, 7 Drawing Sheets

FIBER MANAGEMENT ACCESS SYSTEM

TECHNICAL FIELD

The following disclosure relates generally to systems for managing and organizing fibers, such as optical fibers.

BACKGROUND

Optical fibers can be used to transmit large volumes of data and voice signals over relatively long distances, with little or no signal degradation. For this reason, optical fibers have become widely used in the telecommunication field. As the use of optical fibers has increased, new systems have been developed for managing and organizing larger numbers of optical fibers.

For example, typical optical fiber management systems include cable management structures for storing the fibers or connecting the fibers to one or more other fibers and/or fiber optic devices, such as attenuators, connectors, switches, multiplexers, splitters/combiners, or splices. Such fiber management systems are often mounted to a wall or to an equipment rack. One or more rack units are generally mounted to the wall or rack, and include one or more drawers or trays having the cable management structure for organizing the fibers. Incoming and outgoing fibers typically enter and exit the various rack units from the front and/or rear of the rack unit and drape down the front and/or back of the rack. The fibers may then be pulled to one or both sides of the rack unit and held in place by tethers. However, because the incoming and outgoing fibers drape down, it is difficult to gain access the lower rack units or other equipment to perform service. In addition, with the conventional arrangements there is no provision made to ensure that the incoming and outgoing fibers are not damaged by being bent beyond an acceptable radius when they drape down the rack.

SUMMARY

A fiber management access system to manage fibers is disclosed. In one aspect, the fiber management access system includes a guide that can be movably coupled to an exterior of a chassis for routing fibers of the system.

In another aspect a guide for routing fibers of a fiber management access system is provided that includes a channel for directing fibers of the system to a side of the guide, and has multiple routing troughs located in the channel for routing the fibers. The routing troughs help prevent fibers of the system from being bent beyond an acceptable bend radius.

In yet another aspect, a fiber management access system is provided by forming a guide for routing fibers, and configuring the guide for movable attachment to an exterior of a chassis, such that the guide, once attached to the chassis, will be movable between a plurality of positions, including a first position in which the guide prevents access to a serviceable element and a second position in which the guide is positioned to allow access to the serviceable element.

BRIEF DESCRIPTION OF THE DRAWINGS

The detailed description refers to the accompanying figures. In the figures, the left-most digit(s) of a reference number identifies the figure in which the reference number first appears. The use of the same reference numbers in different figures indicates similar or identical items.

DETAILED DESCRIPTION

This disclosure is directed to implementations including fiber management access systems, guides for guiding fibers of fiber management access systems, and methods of providing fiber management access systems. The implementations are described in the context of a rack-mounted system for managing optical fibers in a telecommunications infrastructure. However, the implementations described herein may be used in other environments and are applicable to other contexts. For example, the apparatuses need not be mounted to a rack, and may, for example, be wall-mounted, free standing, or the like. In addition, the apparatuses may be used to manage fibers other than optical fibers, such as wires, Ethernet cables, coaxial cables, and/or other signal carrying fibers, and may be used in any environment in which such fibers are used.

Fiber Management Access System

Figure 1:
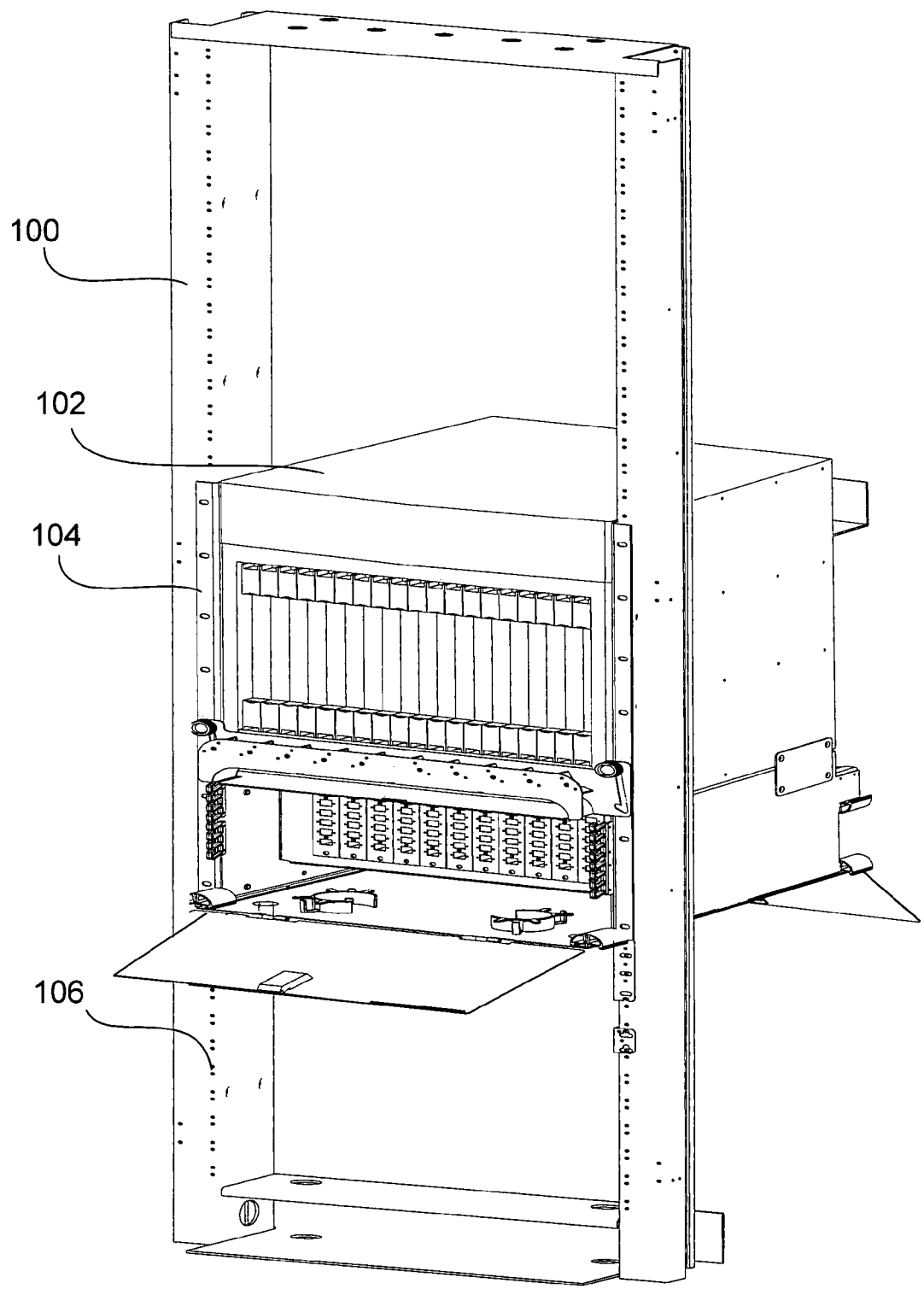
FIG. 1 is a perspective view of one exemplary rack-mounted fiber management access system, having a rack unit with a vertically slidable guide

FIG. 1 illustrates a conventional free standing rack 100, on which a rack unit 102 is mounted. The rack unit 102 is attached via brackets 104 to mounting holes 106 in the vertical sides of the rack 100.

The rack 100 shown in FIG. 1 is typical of those used by, for example, telecommunications companies to organize, route, distribute, hold, or otherwise manage incoming and outgoing optical fibers in a telecommunications facility. While the optical fibers have been omitted from all of the drawings except FIG. 2 (which is discussed in detail below), a brief description of the optical fiber routes through the fiber management system will be useful for clarity. Generally, one or more outside fiber cables enter the telecommunications facility and are fed to the rack unit 102. The outside fiber cables include a plurality of bundled individual optical fibers, which are separated and routed to one or more other optical fibers or optical devices in the rack unit 102. Outgoing fibers exit the rack unit 102 and are routed to other equipment inside or outside the telecommunications facility. In large scale applications, such as in a regional telecommunications carrier for an urban area, whole rooms might be filled with racks similar to the one shown in FIG. 1.

Also, while rack 100 is shown in FIG. 1 with a single rack unit 102 mounted thereon, any number of rack units can be mounted to the rack 100. In addition, the size and shape of the rack units coupled to the rack may vary depending on the particular needs of the user. For example, the width, depth, and thickness of the rack units may differ, the overall shape of the rack units may vary, the specific components of the rack units may vary, and the like.

Figure 2:
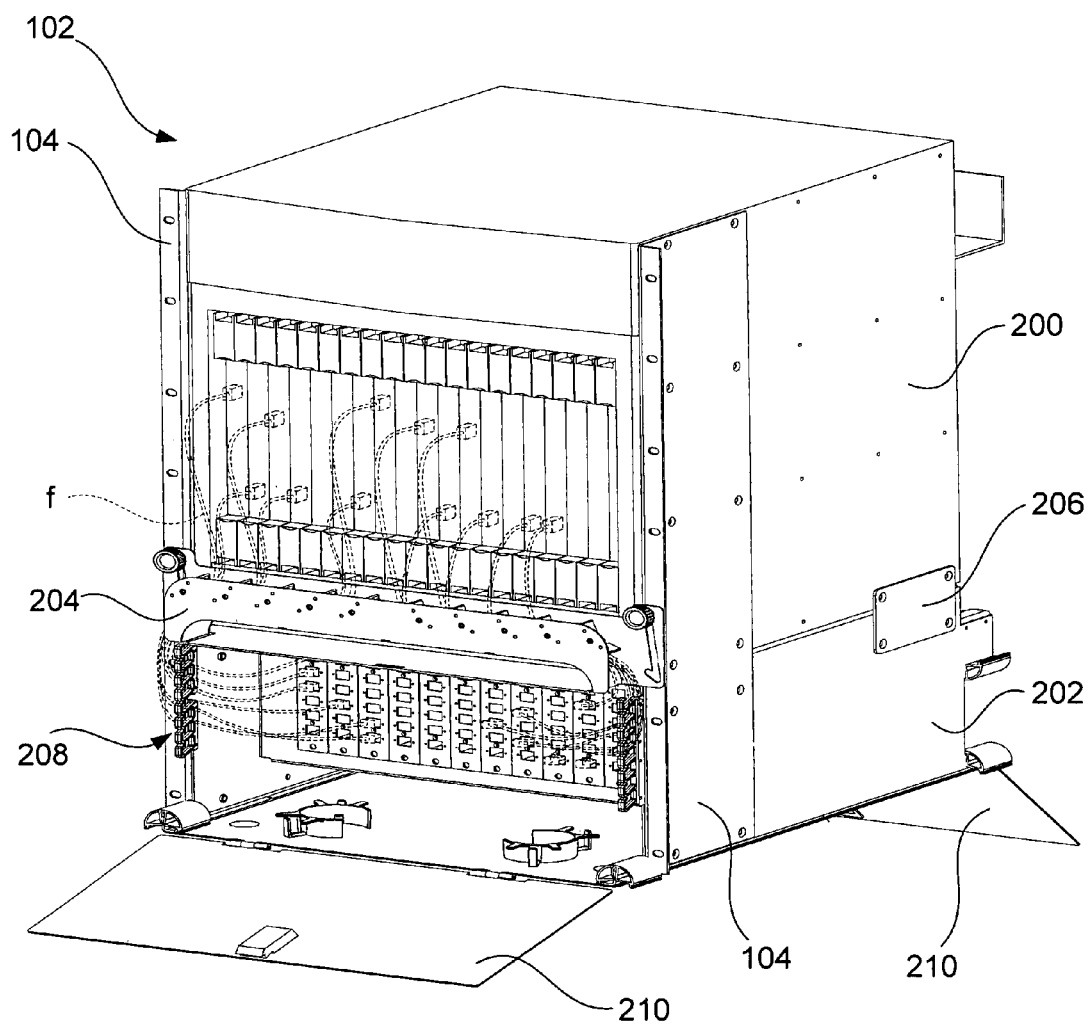
FIG. 2 is perspective view of the rack unit of the system of FIG. 1.

FIG. 2 shows a representative rack unit 102 in more detail. The rack unit 102 includes an upper chassis 200, a lower chassis 202, and a guide 204 coupled via brackets 104 to the exterior of the chassis 200, 202. The guide 204 routes fibers (f) exiting the front of the upper chassis 200 and channels them to a side of the guide and/or chassis 200, 202.

The upper and lower chassis 200, 202 are both secured to the rack 100 by vertical side brackets 104, and to each other by a rear bracket 206. The upper chassis 200 houses a panel of patch connectors, while the lower chassis 202 houses a panel of splitters/combiners. The individual fibers (f) exiting the patch connectors of chassis 200 are routed through the guide 204, through fiber looms 208, and connect to the splitters/combiners of chassis 202. Pivotable access doors 210 cover front and rear openings of the lower chassis 202. Such access doors may, but need not, be provided on either or both of the upper and lower chassis 200, 202. While the upper and lower chassis 200, 202 are described as housing a panel of patch connectors and a panel of splitters/combiners, respectively, each of the chassis may be configured to house any of a variety of fiber management equipment, such as attenuators, connectors, switches, multiplexers, splitters/combiners, and/or splice cassettes, depending on the needs of the user. Also, while two separate chassis are illustrated, in practice, any number of one or more chassis may be used.

While the chassis 200, 202 are shown as being generally rectangular enclosures, having substantially planar top, bottom, and side surfaces, numerous other chassis configurations are also possible, as long as the chassis is capable of supporting one or more pieces of equipment on a rack. By way of example, one or more of the sides of the chassis might be omitted or have a different shape, the chassis could be an open framework with no sides at all, or the chassis could simply include a bracket for securing the rack unit 102 to a rack with no framework or sides at all. In yet another alternative, the chassis could be omitted entirely, and the guide 204 could be coupled directly to a rack, cabinet, wall, or other support structure.

Figure 3:
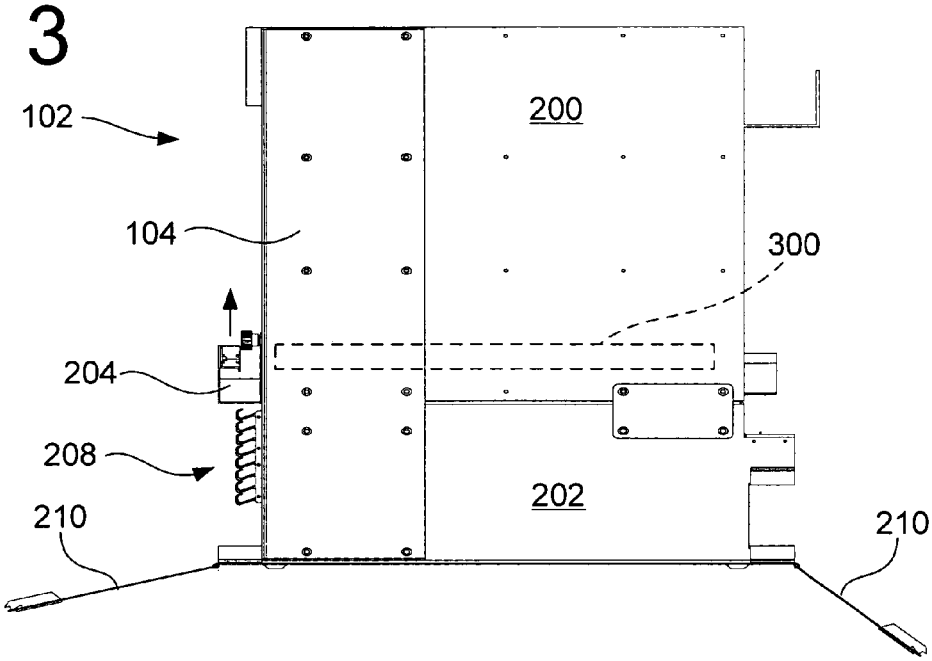
FIG. 3 is a right side view of the rack unit of the system of FIG. 1.

FIG. 3 is a right side view of the rack unit 102, and shows the guide 204 movably coupled to the front of the upper chassis 200. The guide 204 is movable relative to the chassis 200, 202 in the direction of the arrow in FIG. 3, to allow access to a serviceable element 300, such as an air filter, fan, attenuator, connector, switch, multiplexer, splitter, combiner, splice cassettes, or other equipment, located behind the guide 204. Thus, the guide 204 is movable between a plurality of positions, including a first position (shown in FIGS. 2-4), in which the guide 204 prevents access to the serviceable element 300, and a second position in which the guide 204 is positioned to allow access to serviceable element 300. Alternatively or additionally, the guide could be configured such that in the first position a first serviceable element is accessible while access to a second serviceable element is blocked, and in the second position the second serviceable element is accessible while access to the first serviceable element is blocked. Further, if additional serviceable elements are provided at different positions, the guide may be movable so as to allow access to each of the additional serviceable elements in some positions and to obstruct access to the serviceable elements in other positions.

Figure 4:
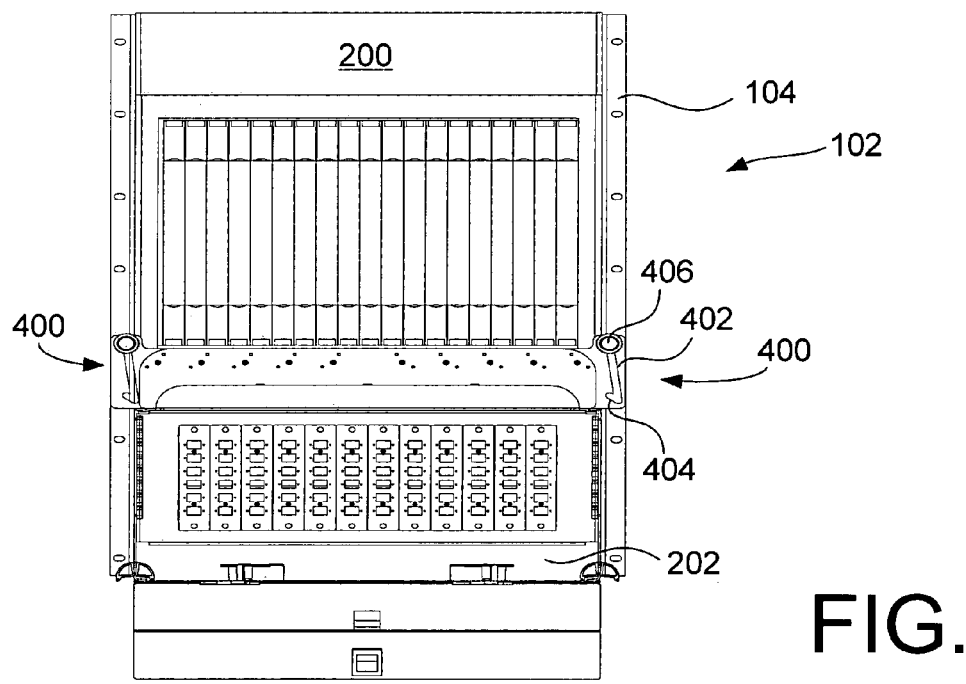
FIG. 4 is a front view of the rack unit of the system of FIG. 1.

FIG. 4 is a front view of the rack unit 102, and shows a mounting feature 400 for movably coupling the guide 204 to chassis 200, 202 via the vertical side brackets 104. The mounting feature 400 comprises substantially vertical, elongated slots 402 formed on each side of the guide 204, and a notch 404 is formed at the bottom of each slot 402 for locking the guide 204 in one of the plurality of positions. The notches 404 are formed at an acute angle relative to the slots 402. Guide pins 406 protruding from the front of vertical side brackets 104 slide in the slots 402 to allow the guide 204 to be raised and lowered. When the guide 204 is in the first position shown in FIG. 4, the upper ends of the slots 402 rest on the guide pins 406 to support the guide 204. When the guide 204 is raised to access the serviceable element 300, the notches 404 can be positioned to rest on the guide pins 406 to support the guide 204 in the second, raised position.

While the guide 204 is described as being slidable between two different positions, the guide 204 may also be positioned in any number of intermediate positions by, for example, providing additional notches at intervals along the length of slots 402. Additionally or in the alternative, the guide could be locked in a desired position by configuring the guide pins 406 with a threaded knob which could be tightened to secure the guide 204 at any desired position between the upper and lower ends of the slots 402. Further alternative mounting features are described below with respect to FIGS. 6 and 7.

Figure 5:
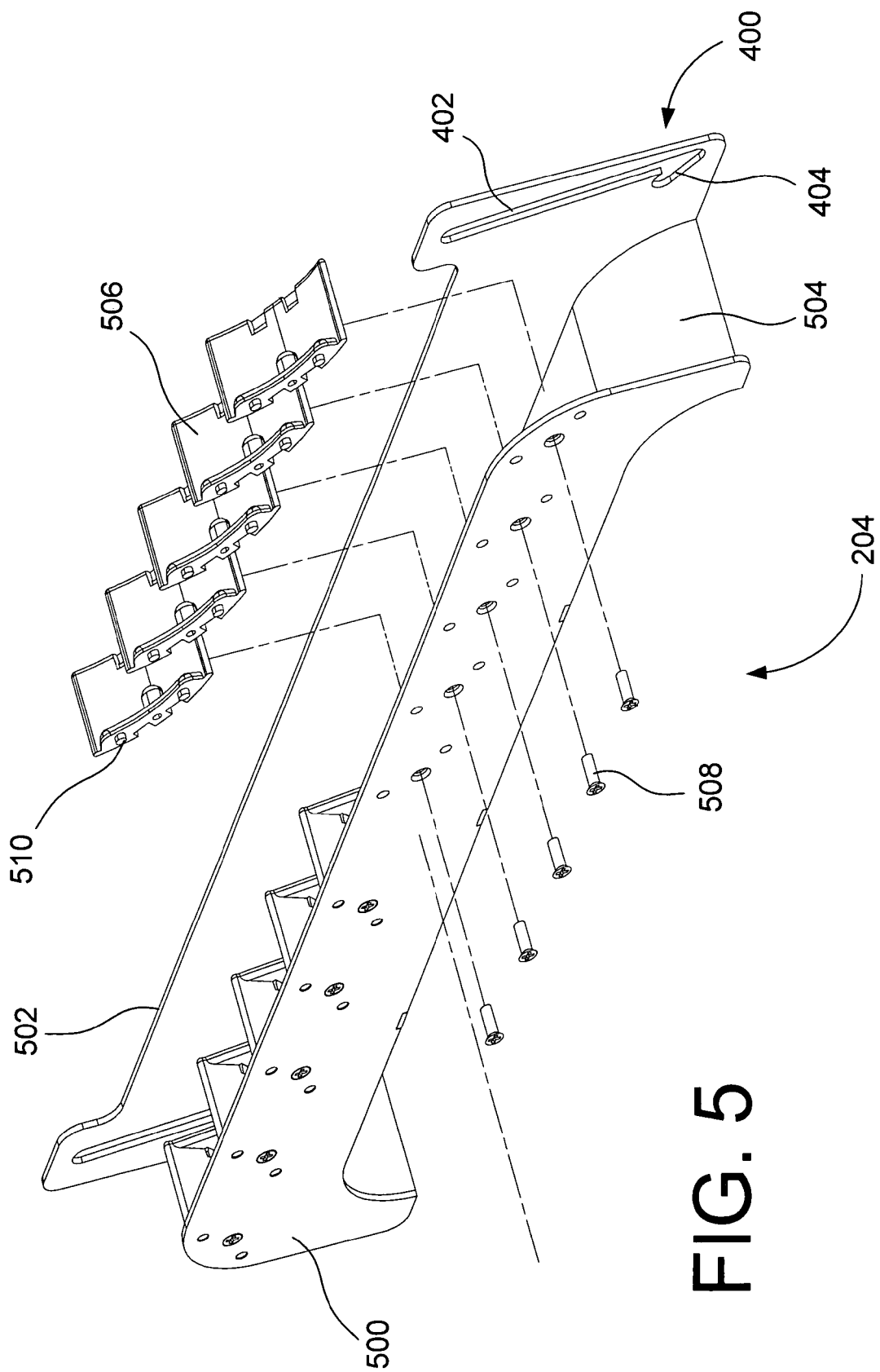
FIG. 5 is an exploded view of the guide of the system of FIG. 1.

FIG. 5 is an exploded view showing the details of the guide 204. The guide 204 comprises a pair of substantially parallel front and back plates 500, 502 and a bottom plate 504 joined together by, for example, welding, to form a channel for directing the fibers to a side of the guide and/or chassis 200, 202. A plurality of arcuate dividers 506 are coupled to the front plate 500 of the guide 204 and form routing troughs for directing the fibers into the channel while limiting an amount by which the fibers are bent as they are routed through the guide 204. The dividers 506 are secured to the front plate 500 by screws 508 or other fasteners, and are fixed against rotation by pegs 510 that protrude from the dividers and engage corresponding apertures 512 in the front plate 500. The arcuate shape of the dividers 506 provides a large bend radius around which the fibers are routed. This helps prevent the fibers from being damaged by being bent too sharply. The lateral ends of the bottom plate 504 are also curved downward to provide an acceptable bend radius about which to route the fibers as they exit the channel. Suitable curvatures for the dividers 506 and the curved ends of the bottom plate 504 depend on the size of the individual fibers, and will be readily apparent to one of ordinary skill in the art. Alternatively, the dividers could be configured in a variety of different shapes, including circular, oval, curvilinear, tapered, trapezoidal, linear, or any other shape around which fibers can be routed.

As shown in FIG. 5, the mounting feature 400 is formed in the back plate 502 of the guide 204. However, the mounting feature 400 may be formed in both the front and back plates 500, 502 of the guide 204, in only the front plate 500, or in one or more additional plates or flanges (not shown) attached to the guide 204.

While the guide 204 is shown in FIGS. 1-5 as being slidable substantially vertically relative to the chassis 200, 202, other movable arrangements of the guide are also possible.

Figure 6:
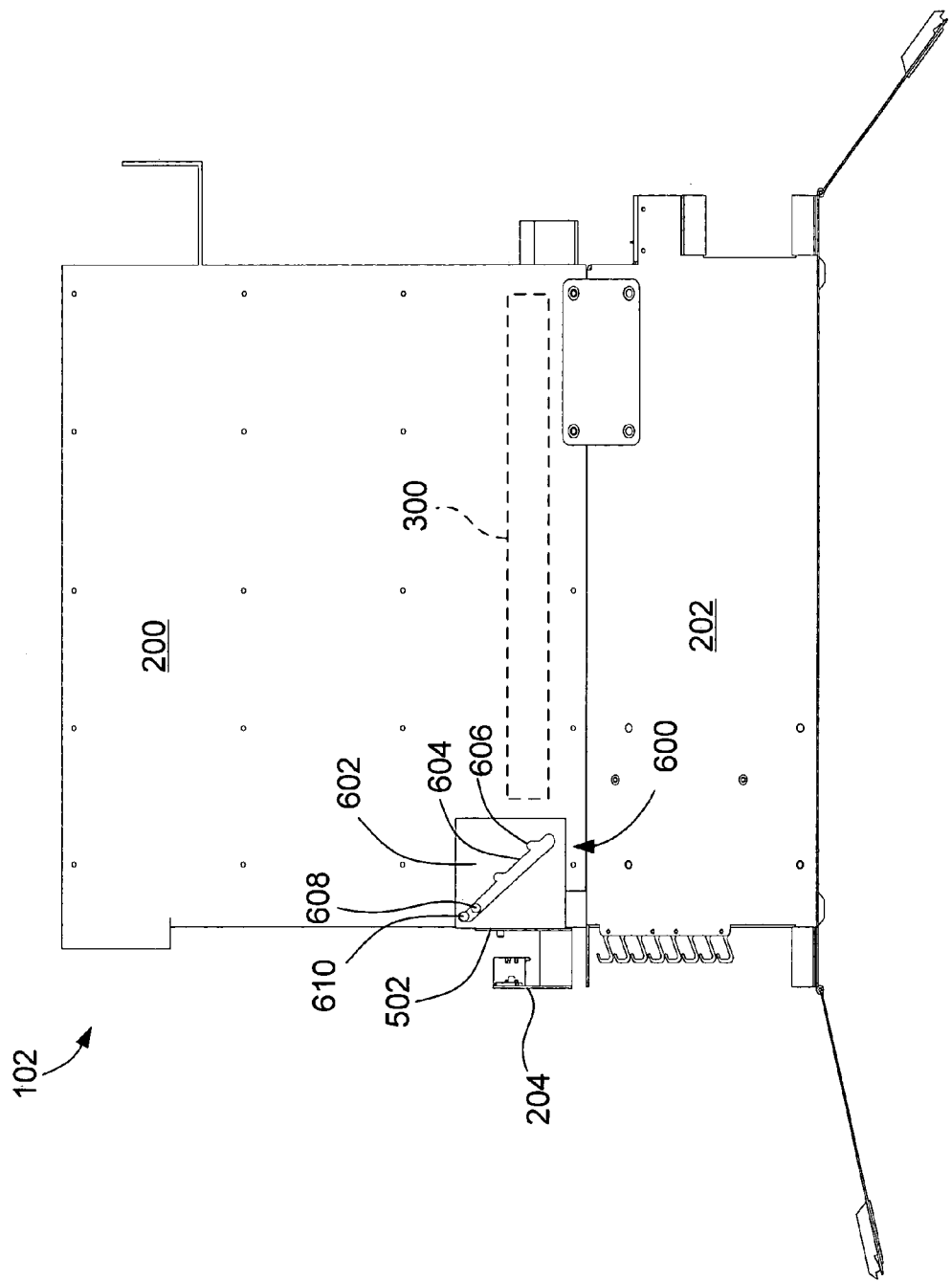
FIG. 6 is a right side view of a rack unit of another exemplary fiber management access system, having a vertically and horizontally slidable guide.

FIG. 6 illustrates one alternative arrangement, in which the guide 204 is slidable both vertically and horizontally relative to the chassis 200, 202. This arrangement is similar to the arrangement described with respect to FIGS. 1-5, except for the manner in which the guide 204 is movably coupled to the chassis 200, 202. In the arrangement of FIG. 6, the guide 204 includes a mounting feature 600 having flanges 602 protruding from, and substantially perpendicular to, the back plate 502 of the guide 204. The flanges 602 wrap around and extend substantially parallel to the sides of the chassis 200 or the vertical sides of the rack 100. Each of the flanges 602 has an elongated, horizontally- and vertically-extending slot 604 formed therein. Vertical notches 606 are formed in an upper edge of each of the slots 604 at various locations along the length of the slots 604.

A guide pin 608 and a locking pin 610 protrude from the lateral sides of the rack 100 or from a flange (not shown) extending from the vertical side brackets 104, and slide in the slots 604 of the mounting feature 600. The locking pin 610 engages the notches 606 formed in the flange 602 to hold the guide 204 on a plurality of different positions, including a first position (shown in FIG. 6) in which the guide 204 prevents access to the serviceable element 300, and a second position in which the guide 204 is positioned to allow access to serviceable element 300.

Also, in addition to the first and second positions, the guide 204 may be positioned and locked in any number of intermediate positions by, for example, providing additional notches at intervals along the length of slots 604, or by including a threaded knob on at least one of the guide pins 608 or locking pins 610 which could be tightened to secure the guide 204 at any desired position between the upper and lower ends of the slots 604. Also, while separate guide and locking pins 608, 610 are described, an integral guide/locking pin or tab could instead be used to support the guide 204. In addition, while the slots 604 are shown in FIG. 6 as being linear, the slots could instead by made arcuate, curvilinear, or any other suitable shape that would allow the guide 204 to be slid out of the way, to provide access to a serviceable element.

Figure 7:
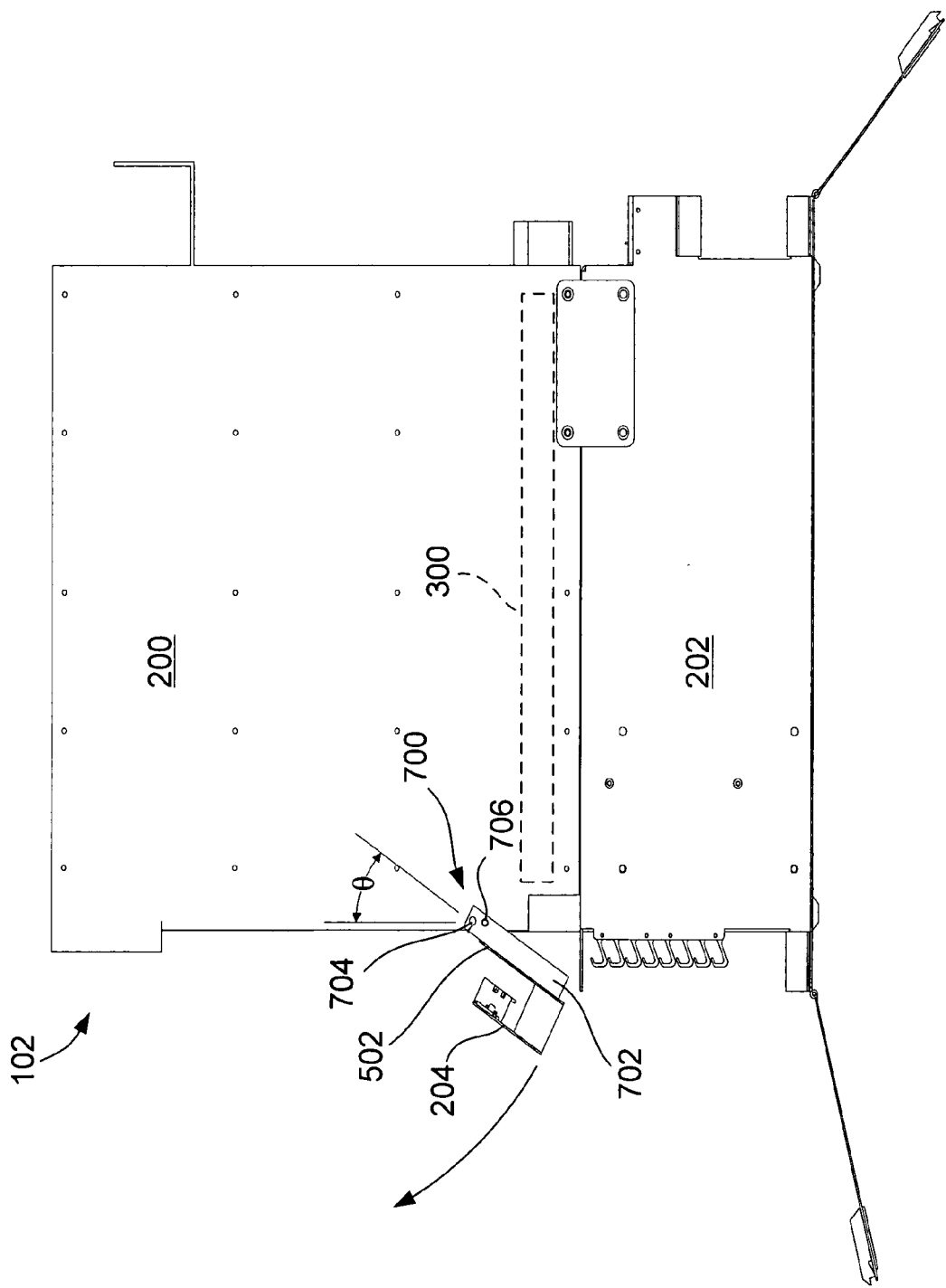
FIG. 7 is a right side view of a rack unit of yet another exemplary fiber management access system, having a pivotable guide.

FIG. 7 illustrates another alternative arrangement, in which the guide 204 is pivotable relative to the chassis 200, 202. This arrangement is also similar to the arrangement described with respect to FIGS. 1-5, except for the manner in which the guide 204 is movably coupled to the chassis 200, 202. In the arrangement of FIG. 7, the guide 204 includes a mounting feature 700 having flanges 702 protruding from, and substantially perpendicular to, the back plate 502 of the guide 204. The flanges 702 wrap around and extend substantially parallel to the sides of the chassis 200 or the vertical sides of the rack 100. The flanges 702 are coupled to the chassis 200 or rack 100 by pivot pins 704 protruding from the sides of the chassis 200 or rack 100, such that the guide 204 is pivotable between a plurality of different positions, including a first position in which the guide 204 prevents access to the serviceable element 300, and a second position in which the guide 204 is positioned to allow access to serviceable element 300. The guide 204 is pivotable through an angle θ relative to the chassis 200, 202, which can range from about zero degrees to about 180 degrees. In FIG. 7, the guide 204 is in an intermediate position, partway between the first and second positions.

The mounting feature 700 also includes a locking mechanism, such as a detent 706, that engages with one or more apertures or depressions (not shown) in the chassis 200, 202 or rack 100 for holding the guide 204 in one or more of the plurality of positions. Of course, various other types of locking mechanisms could instead be used to hold the guide 204 in the various positions, such as a prop arm, a high friction material (e.g., rubber) located between flanges and the chassis or rack, a protrusion that engages one or more corresponding indentations in the side of the chassis or rack (i.e., an interference fit), and the like.

Also, in addition to the first and second positions, the guide 204 may also be positioned and locked in any number of intermediate positions by, for example, providing additional detents or other locking mechanisms along the length of slots 604, or by including a threaded knob on the end of the pivot pins 704 which could be tightened to secure the guide 204 at any desired angle θ within the range of motion of the guide 204.

Provision of System

Figure 8:
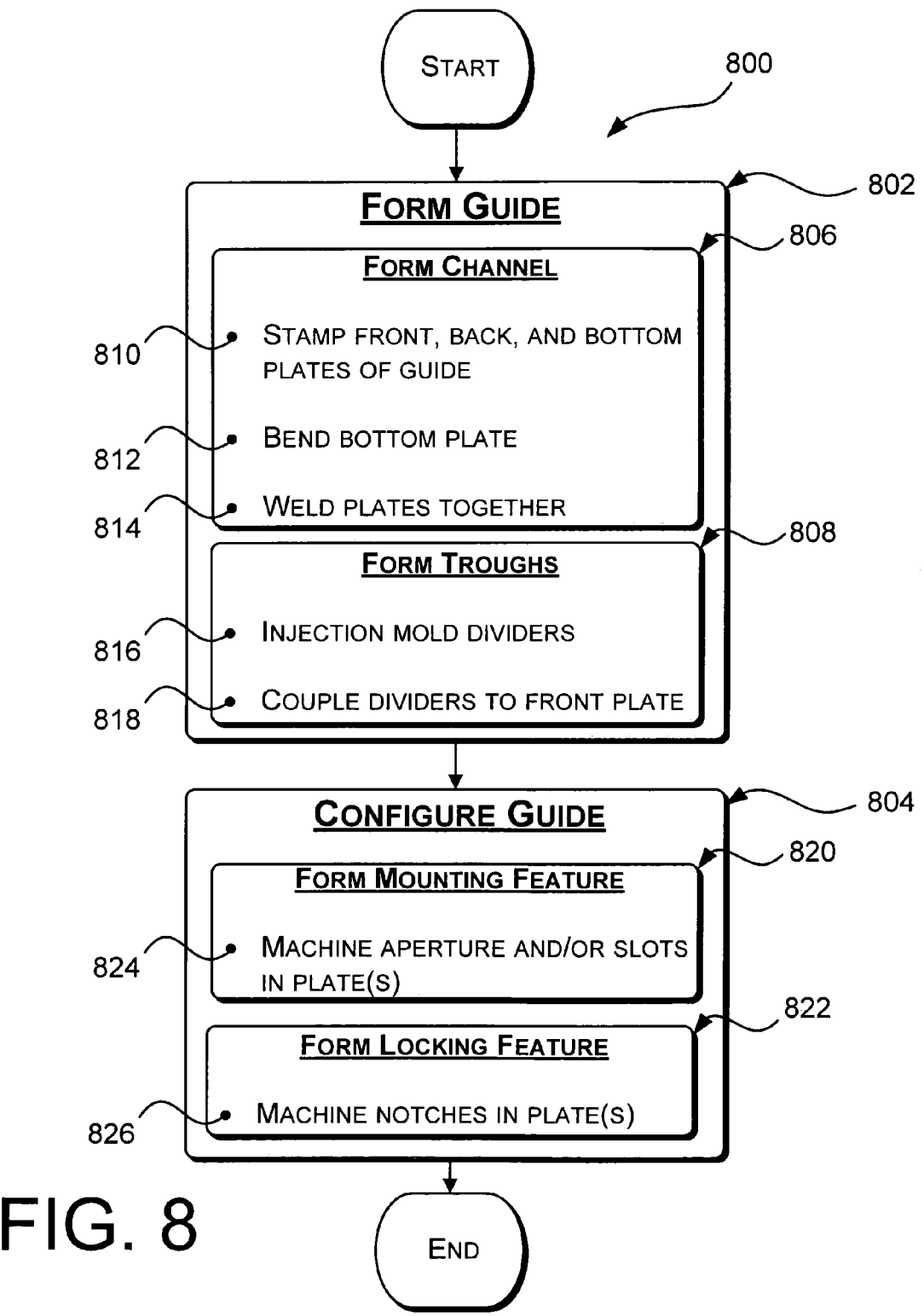
FIG. 8 is a flow chart showing an exemplary method of providing a fiber management access system.

FIG. 8 illustrates an exemplary method 800 of providing a fiber management access system. Generally, the method 800 comprises at 802 forming a guide for routing fibers, and at 804 configuring the guide for movable attachment to an exterior of a chassis, such that the guide, once attached to the chassis, will be movable between a plurality of positions, including a first position in which the guide prevents access to a serviceable element and a second position in which the guide is positioned to allow access to the serviceable element.

Forming the guide at 802 includes at 806 forming a channel for directing the fibers to a side of the guide or chassis, and at 808 forming a plurality of routing troughs in the channel for routing the fibers.

Forming the channel at 806 further includes at 810 stamping three elongated plates (i.e., front, back, and bottom plates), out of which to construct the channel, at 812 bending the ends of the bottom plate downward to provide a large bend radius for the fibers, and at 814 attaching the front, back, and bottom plates together by, for example, spot welding, to form the channel. The plates may be metal, plastic, or any other material capable of supporting and routing the fibers. Also, while the channel is described as being constructed of three pieces, the channel could be formed by any number of one or more pieces. For example, if multiple pieces are used to construct the channel, the pieces can be coupled together by any suitable coupling means, such as screws, rivets, snap connectors, interference fits, adhesive, welding, and the like. Also for example, if the channel is formed of a single piece, the channel could be injection molded, die cast, machined, or the like. Of course, various other materials and manufacturing techniques will be apparent to one of ordinary skill in the art.

Forming the plurality of routing troughs at 808 further includes at 816 forming a plurality of substantially arcuate dividers by, for example, injection molding, die casting, or the like, and at 818 coupling the arcuate dividers to the front plate by fasteners, such as screws, rivets, adhesive, spot welding, and the like. The arcuate dividers are oriented and attached to the guide at angles that minimize the bend radius that the fibers are subjected to. The arcuate dividers can also be made of metal, plastic, or any other material capable of supporting and routing the fibers, and can be coupled to the guide by any suitable coupling means, such as those discussed above with respect to the channel. Also, while the dividers are described as being separate pieces that are attached to the guide, it is also possible to form the dividers integrally with a portion of the guide. For example, the dividers could be injection molded as an integral part of the channel. In that case, the entire guide, including the channel and the dividers could be formed as a single, integral piece.

Configuring the guide for movable attachment to an exterior of a chassis at 804 includes, at 820 forming a mounting feature, and at 822 forming a locking feature.

Forming a mounting feature at 820 further includes at 824 forming slots and/or apertures in at least one of the front, back, or bottom plates used to form the guide by, for example, standard machining techniques. Alternatively, the one or more slots and/or apertures can be formed in flanges or brackets coupled to the plates, rather than the in the plates themselves. This step may be performed at various times during the provisioning method 800, including prior to stamping out the elongated plates used to form the channel, or after stamping, but before coupling the plates to form the channel. Other suitable mounting features will be apparent to those of ordinary skill in the art.

Forming the locking feature at 822 can be accomplished by at 826 forming a protrusion, indentation, and/or notch in a portion of the guide for engagement with a complimentary feature on the chassis or rack. Alternatively, the locking feature may be formed by installing a detent mechanism on the guide that engages one or more apertures on the chassis or rack. In another alternative, a piece of high friction material, such as rubber, can be mounted on the guide for engagement with a surface of the chassis or rack to hold the guide in a desired position. Other suitable locking features will be apparent to those of ordinary skill in the art.

In the foregoing manner a fiber management access system can be provided.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A fiber management access system comprising:
   a support structure including an enclosure for managing signal-carrying fibers; and
   a guide for routing the fibers disposed at and movably coupled external to the enclosure to an exterior surface of the enclosure,
   wherein the guide is movable relative to the enclosure to provide access to a serviceable element located within the enclosure, without removal of the guide from the support structure.

2. A system according to claim 1, wherein the guide comprises a channel for directing the fibers to a side of the guide.

3. A system according to claim 2, wherein the guide further comprises a plurality of routing troughs disposed in the channel for routing the fibers.

4. A system according to claim 3, wherein each routing trough comprises a substantially arcuate divider for directing the fibers into the channel and limiting an amount by which the fibers can be bent.

5. A system according to claim 2, wherein the channel comprises elongated, substantially parallel front and back plates, and a bottom plate.

6. A system according to claim 5, wherein longitudinal ends of the bottom plate are curved downward to route the fibers as the fibers exit the channel.

7. A system according to claim 5, wherein the guide further comprises a plurality of substantially arcuate dividers coupled to at least one of the front and back plates and disposed in the channel for routing the fibers.

8. A system according to claim 1, wherein the support structure comprises a housing having two vertical side brackets, and wherein the guide is movably coupled to both vertical side brackets.

9. A system according to claim 1, wherein the guide is at least one of pivotable and slidable relative to the support structure.

10. A system according to claim 1, further comprising a serviceable element mounted in the support structure, wherein the guide is movable between a plurality of positions, including a first position in which the guide prevents access to the serviceable element and a second position in which the guide is positioned to allow access to the serviceable element.

11. A system according to claim 10, wherein the serviceable element comprises an air filter, fan, attenuator, connector, switch, multiplexer, splitter, combiner, or splice cassette.

12. A system according to claim 10, wherein the guide includes a locking feature for locking the guide in at least one of the plurality of positions.

13. A system according to claim 1, wherein the system forms a part of a telecommunications infrastructure.

14. A guide for routing fibers of a fiber management access system, the guide comprising:
    a channel for directing the fibers to a side of the guide;
    a plurality of routing troughs disposed in the channel for routing the fibers; and
    a mounting feature for mounting the guide external to a chassis, to an exterior surface of the chassis, the mounting feature comprising a pair of apertures or slots formed in at least one of the front and back plates for movably mounting the guide to the chassis, such that the guide can at least one of pivot or slide between a plurality of positions relative to the chassis.

15. A guide according to claim 14, wherein each routing trough comprises a substantially arcuate divider for directing the fibers into the channel and limiting an amount by which the fibers can be bent.

16. A guide according to claim 14, wherein the channel comprises elongated, substantially parallel front and back plates, and a bottom plate.

17. A guide according to claim 16, wherein longitudinal ends of the bottom plate are curved downward to route the fibers as they exit the channel.

18. A guide according to claim 14, wherein the channel comprises elongated, substantially parallel front and back plates, and a bottom plate, and wherein each routing trough comprises a substantially arcuate divider coupled to at least one of the front and back plates for directing the fibers into the channel and limiting an amount by which the fibers can be bent.

19. A guide according to claim 14, wherein the guide includes a locking feature for locking the guide in at least one of the plurality of positions.

20. A method of providing a fiber management access system, comprising:
    forming a guide for routing fibers; and
    configuring the guide for movable attachment external to a chassis defining an enclosure, to an exterior surface of the chassis, such that the guide, once attached to the chassis, will be movable between a plurality of positions, including a first position in which the guide prevents access to a serviceable element located within the enclosure and at least partially obstructed by the guide, and a second position in which the guide is positioned to allow access to the serviceable element.

21. A method according to claim 20, wherein forming the guide comprises forming a channel for directing the fibers to a side of the guide, and installing a plurality of routing troughs in the channel for routing the fibers.

22. A method according to claim 21, wherein configuring the guide further includes forming a locking feature for locking the guide in at least one of the plurality of positions.

23. A method according to claim 20, wherein configuring the guide includes forming a mounting feature for movably mounting the guide to a chassis, such that the guide is movable between the plurality of positions.

24. A method according to claim 23, wherein forming a mounting feature includes forming a pair of apertures or slots in the guide, by which the guide can at least one of pivot or slide relative to the chassis.

* * * * *